Figure 14:
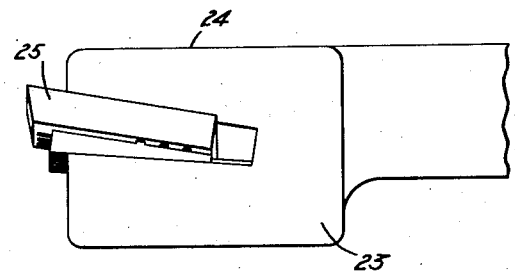

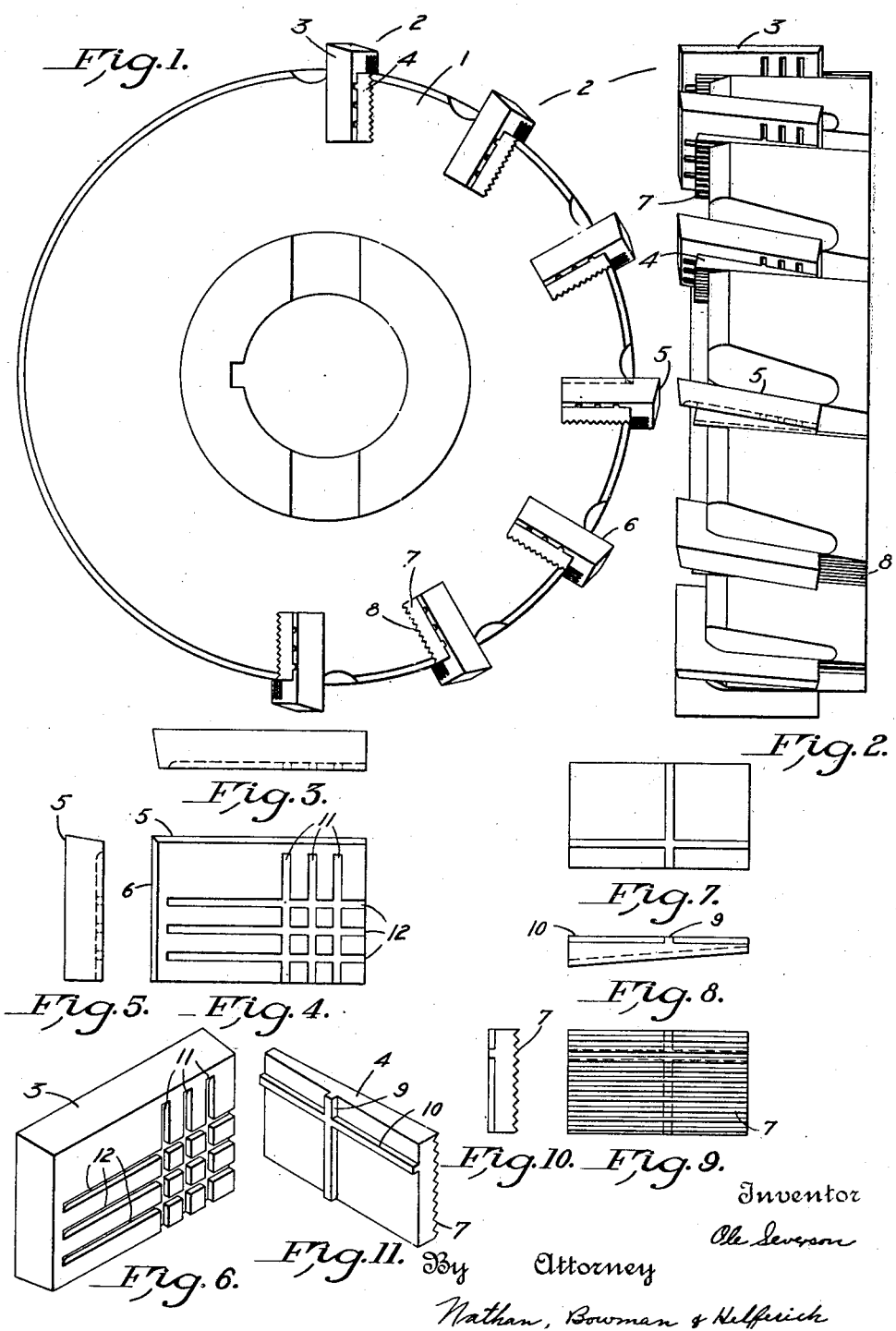

June 12, 1934. O. SEVERSON 1,962,725
CROSS LOCKED INSERTED BLADE CUTTER
Filed March 21, 1931 2 Sheets-Sheet 2

Inventor
Ola Severson

By Attorney
Nathan, Bowman & Helfrich

Patented June 12, 1934

1,962,725

UNITED STATES PATENT OFFICE 1,962,725

CROSS LOCKED INSERTED BLADE CUTTER

Ole Severson, Shelton, Conn., assignor to The O. K. Tool Company, Inc., New York, N. Y., a corporation of New York Application March 21, 1931, Serial No. 524,288

10 Claims. (Cl. 29—105)

This invention relates to cutter tools of the insertable blade type. The insertable blade cutter long ago was developed and found to have very decided advantages which has lead to their universal use over a period of many years. By means of such an arrangement the various parts of the cutter are possessed of inherent characteristics suited to the functions necessary to be performed. The main supporting body is made readily of an exceedingly strong, tough material capable of having blade slots machined therein and otherwise formed in the ultimate shapes desired. The insertable blades, however, are made of high speed steel or other suitable alloy which has the characteristic of being exceedingly hard, capable of withstanding very high temperatures without injury, and having many of the other characteristics particularly desirable in a cutting edge.

The cutter tool thus constructed is capable of operating under severe conditions and is, furthermore, an economical tool insofar as long continued use is concerned, since broken or worn out blades can be readily replaced at a relatively small cost. A further advantage derived from such a type cutter, as it was gradually developed, was the provision of means for adjusting the cutter blade in its slot to compensate for wear and grinding, and thereby maintain the cutter of a predetermined size and prolonging the life of the cutter, without even the necessity of resorting to the substitution of new blades.

The use of insertable blades, particularly when coupled with means for adjusting the blades, has, however, led to serious problems in maintaining the blades in their correct position under the severe operating conditions to which they were especially subjected when equipped with blades of special alloy.

The important part played by the cutter tool; and the efforts to obtain these two features, namely, that of an insertable and adjustable blade, and at the same time an extremely solid rigid cutter construction has led to an almost infinite variety of ingenious constructions and combinations, very few of which, however, have found any commercial or practical use due chiefly to the inability of machine tool men to completely reconcile these quite opposite attributes of blade adjustability and cutter rigidity.

The present invention accomplishes these results in a manner more complete than heretofore found possible. Through the combination of blade and wedge means provided, the blade is capable of being adjusted not only in one direction but also in a direction transversely thereto and thereby compensating for any normal wear on the machine tool blade. These adjustments can be separately made in either direction, if desired.

The invention can be employed in practically any of the standard types of cutters. A particular advantage which may be noted is that in the case of most cutters it is desirable to maintain the cutter of a certain size. In the present cutter, although an exceedingly large range of adjustment is provided the combined construction affords a very fine adjustment in the direction in which it is desired to maintain a fixed diameter, e. g. and this dimension may be maintained, therefore, without any excessive grinding.

The invention, as specifically illustrated, includes the cutter blade proper and a locking wedge member co-acting therewith. The adjusting and the locking means for the blade consist primarily, in the specific embodiment of the idea disclosed herein, of a rib on the wedge member adapted to be selectively engaged in any one of a plurality of complemental grooves in the adjoining surface of the blade, which provides a major adjustment for the blade in one direction. A similar rib and groove construction extending in a direction at right angles to the first rib provides a major adjustment in a direction transverse to the first adjustment. Each adjustment can be independently utilized, if desired. The blade and tapered locking member are thereby positively locked together previous to their insertion in the slot of the cutter body. The pre-assembled blade and wedge member are rigidly locked in the body member through frictional engagement in one direction and in the opposite direction through the interlocking of serrations on the wedge member with serrations on the wall of the opening in the cutter body. These serrations extend in the direction of the taper and provide the fine adjustment of the blade in a direction transverse to the taper heretofore mentioned.

A most striking advantage of the present construction and a use for which it is particularly adapted is that in connection with blades made of special alloys, such e. g. as stellite and many of the other extremely hard materials utilized for cutter blades. While these special alloys have most desirable cutting qualities, they are, however, extremely difficult and costly of formation into intricate shapes. In accordance with the present invention, blades may be made of one of these special alloys in very simple elemental shapes with e. g. rectangular surfaces. The grooves can then be successfully produced in the blade member by a grinding operation. The required intricate formations, such as the complemental ribs and the serrations, are formed on the wedge member, which can be of a relatively softer material capable of being machined readily.

A further very decided advantage in the present invention is the adaptability of the compound blade construction to usage in cutter bodies of a type extensively sold and employed at the present time. The patent to Ritchie No. 1,354,578 describes a cutter construction of wide commercial usage. The major feature thereof is a tapered blade and blade opening in the cutter body with serrations on one surface of the blade interfitting with complemental serrations on the wall of the cutter slot. The compound construction disclosed in the present application is capable of substitution and use in such a type cutter where circumstances make it desirable.

The ultimate result is a compound blade in which the component parts, the cutter blade proper, and its wedge member are positively locked together and the construction as a whole is securely and most rigidly wedged and locked in the cutter body. The component parts are provided with ample plane bearing surfaces and the cutter tool, as a whole, is possessed of a rigidity scarcely surpassed by a cutter tool of the solid type with integral blades.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 13:
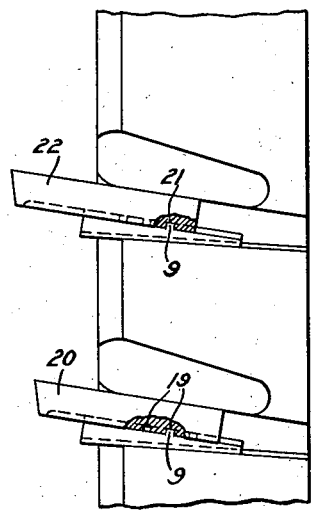
Figure 12:
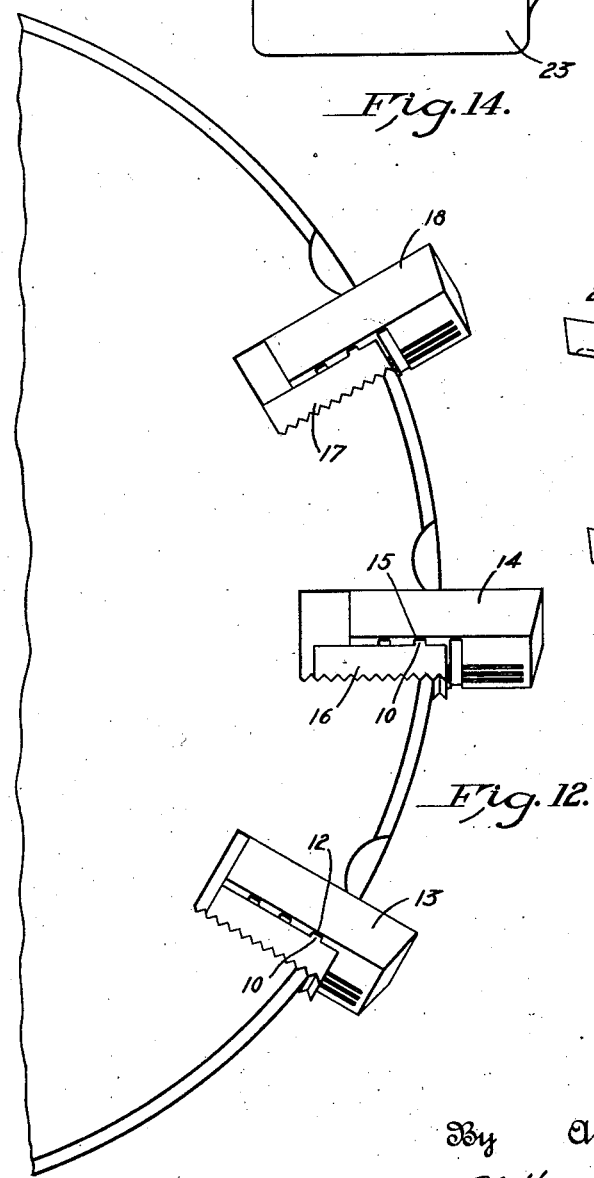

Figure 1 shows the invention embodied in a face mill type of cutter. Fig. 2 is a view of the same cutter looking from the right in Fig. 1. Figs. 3 to 6 inclusive are views of the cutter blade proper in various positions to show better its specific construction. Figs. 7 to 11 inclusive are similar views of the wedge locking member. Fig. 12 is a fragmentary end view of a cutter on an enlarged scale depicting the blade in various radially adjusted positions. Fig. 13 is a fragmentary side view similar to Fig. 2 showing blades in different axial positions; and Fig. 14 shows the invention applied to a shank cutter tool.

Referring first to Figure 1, there is shown a cutter of the insertable blade type having a main supporting body 1, with a series of compound cutter blade means 2 therein consisting of the cutter blade proper 3 and a wedge locking member 4.

The cutter blade proper, it will be seen, is a plain, simply shaped plate with substantially rectangular surfaces with the exception that the cutting edges 5 and 6 are bevelled off to provide the usual clearance. The wedge locking member 4 is tapered in the direction of its insertion in the cutter body and is provided on one side with a series of serrations 7 complemental to the serrations 8 formed in the blade slots of the cutter body, these serrations extending in the direction of the taper. The side of the wedge member 4 opposite to the serrations is provided with crossed rib members 9 and 10 respectively. Referring for convenience to Figs. 6 and 11, it will be seen that the rib 9 is capable of being selectively engaged in any one of the similar grooves 11 of the adjoining face of the cutter blade. In a corresponding manner the rib 10 is adapted to be selectively engaged in any one of the complemental grooves 12 of the cutter blade.

These ribs and their respective complemental grooves are of such shape, it will be seen, as to enable them to be formed in a very accurate and closely dimensioned manner and after the elements are wedged in the cutter blade slot, form a very positive strong interlocking means completely prohibiting any disturbance of the setting of the blade.

Figs. 12 and 13 illustrate typical adjustments which may be obtained with a compound blade and interlocking means constructed in accordance with the principle of this invention. Various radial adjustments in a face milling cutter are illustrated in Fig. 12. Although this cutter is similar to that shown in Fig. 1, different numerals are applied to the blade and wedge locking member for clarity of description. In this Fig. 12 the blade 13 is shown adjusted radially from the position shown in Fig. 1 by the width of one serration, the rib 10 being in the outermost groove 12 of the blade 13. Blade 14 is shown with the rib 10 in engagement with the next inner groove 15 of the blade 14, the wedge member 16 being in a position similar to that in the blade slot below. In the upper part of Fig. 12 the wedge locking member 17 is shown in its innermost position but the blade 18 has been given a major adjustment similar to that in the middle blade slot shown in this figure.

Longitudinal adjustments of the blade in the direction of the cutter axis are shown in Fig. 13. In the lower slot of this figure, the rib 9 is shown in engagement with the middle groove 19 of the blade 20, the groove 19 corresponding to one of the grooves 11 shown in Fig. 6. In the upper blade slot of Fig. 13 the rib 9 is shown in the innermost groove 21 of the blade 22. It will be recognized that either of the adjusted positions shown in Fig. 13 may be employed in connection with any of the radial positions shown in Fig. 12 and conversely. In other words, adjustment in either direction may be accomplished without disturbing the position in the other direction.

In the case of a cutter, like that shown in Figure 1, it is frequently desirable to maintain the diameter of the cutter of fixed dimension and accordingly the cutter blade projects a correspondingly fixed distance from the cutter body. The present construction affords a very efficient and beneficial means for accomplishing this purpose. Major adjustments can be made through movement of the rib 10 from one groove 12 to another; and minor or finer adjustments made by movement of the wedge locking member 4 from one position to another in accordance with the width between serrations.

The serrations in the wedge locking member and on the corresponding opposed surface of the blade slot may be of any size desired in accordance with the circumstances, the finer the serrations the finer the adjustment. In addition, if a still finer adjustment is desired, the serrations in one slot may be advanced outwardly from the axis a small distance further than the serrations in the preceding slot and so on progressively around the cutter. This amount of advancement from one slot to the next would, of course, be but a fraction of the distance between two adjacent serrations. The result would be that if a blade and its locking member were moved from one slot to the next adjoining it could thereby be advanced a matter of a few thousandths of an inch, and the tool re-sharpened and the previous overall diameter maintained without any excessive grinding.

Fig. 14 shows the invention embodied in a tool of the shank type, such as would be employed on a lathe. The construction and assemblage of the cutter blade means in the shank member 23, will be readily apparent from the description heretofore given in connection with the rotary cutters and it is believed no further details are necessary. For added rigidity and to prevent any tendency of the sides of the blade opening in the shank 23 to spring apart, the shank may be mounted in its holder in such a way that the bolts for securing it act directly on the surface 24 at a point over the cutter blade 25.

It will be apparent from the disclosure that the invention is capable of embodiment in the various conventional types of cutters not specifically shown herein, as e. g. slotting or alternate angle cutters, straddle mills, end mills, face mills and boring heads. In this connection it is to be noted that the term "blade" as employed herein is not used in the strict sense, as meaning a member which is necessarily thin in comparison with its length and width, but includes the variously shaped cutter bits as they are employed in conventional type cutters.

The invention, it will be recognized, provides a cutter having the advantages of removable and adjustable blade cutters without sacrificing to any degree the characteristics of rigidity and strength necessary in a cutter tool designed for universal usage.

A particular point of the utmost importance in connection with this construction is the fact that the blades may be made of one of the special alloys, such as stellite, which are impossible or costly of production in intricate forms, such as are required in connection with the heretofore known types of constructions for insertable blade cutters having means for adjustment of the blades. The grooves 11 and 12 are capable of being readily formed by grinding operations. In contrast thereto to the various shapes such as sharp cornered V-grooves required in previously developed constructions have only been produced in the extra hard alloy cutting materials with the utmost difficulty and at prohibitive cost. All the intricate shapes necessary for the production of a wedging and locking means can be applied, in accordance with the present invention, to the wedge member 4 which may be of a softer material and susceptible to the usual shop machining operations.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, I claim as new and desire to secure the following combinations and elements, or equivalents thereof, by Letters Patent of United States:—

1. An inserted blade cutting tool comprising a supporting body having a longitudinally tapered blade opening provided with forward and rear walls respectively plain and irregularly formed therein; a blade member and a locking member therefor combinedly shaped to fit in said opening and one of said members having a taper to provide a wedging action for initially securing the blade member in position and for tending to clamp the blade into tighter engagement under the reactionary pressure of the work, the forward surface of said blade being a plain surface adapted frictionally to engage said plain forward wall of the opening; and interfitting formations between the locking member and the adjacent rear face of the blade extending transversely to the direction of the taper of the opening member, and other interfitting formations between the locking member and the adjacent wall of said opening extending in the direction of the taper to positively hold said locking member against displacement until the blade is withdrawn.

2. An inserted blade cutting tool comprising a supporting body having a longitudinally tapered blade opening formed therein the forward wall of said opening being a plain surface, blade means having a forward plain face adapted frictionally to engage said plain wall insertable in said opening, said blade means being formed in two sections one of said sections constituting the blade proper and the other section a locking member one of said members being tapered in a longitudinal direction and fitted with the other member to provide a wedging means in the direction of insertion of the blade for securing the blade in said opening, and arranged to be urged into tighter wedging condition by the reactionary pressure of the work thereon; a series of interfitting formations between the locking member and the adjacent rear wall of the supporting body blade opening; and a series of interfitting formations between the locking member and the adjacent rear face of the blade extending crosswise the taper of the opening for selectively maintaining the blade in any one of a plurality of adjusted positions, and for positively holding said locking member against displacement while the blade member is wedged in position.

3. A rotary cutting tool combining a supporting body having a series of tapered blade openings in the periphery thereof, and cutter blade and locking means therefor in each of said openings comprising a cutter blade member; a cooperative wedge member adjacent said blade member; interfitting serrations on said wedge member and the adjacent wall of said opening extending in the direction of said taper enabling transverse adjustments of said wedge member; a rib on one of said members, the other of said members being provided with a series of grooves in which said rib is adapted selectively to be engaged for adjustment of said blade member in one direction; and a rib on one of said members extending in a direction transverse to said first mentioned rib, the opposed member being provided with a series of grooves in which said transverse rib is selectively engageable for adjustment of the blade member in a direction transverse to said first direction.

4. A cutter combining a supporting body having a tapered blade opening; a cutter blade member therein; a wedge member in said opening fitting adjacent to and cooperating with said blade to wedge the latter in said opening; means to prevent movement of said wedge member transverse to said taper; a rib on one of said members extending in the direction of said taper, the other of said members being provided with grooves in which said rib is adapted selectively to be engaged to lock said blade in selected positions; and a rib on one of said members extending in a direction transverse to said first rib, the other of said members being provided with grooves in which said second rib is adapted selectively to be engaged to lock said blade in adjusted positions progressing in a direction transverse to said first adjustment.

5. A cutter combining a supporting body having a tapered blade opening therein; a cutter blade member mounted therein; a tapered locking member located in said longitudinally opening and bearing against said blade to form a wedging means for said members; cross ribs on one of said members one of said cross ribs extending in a direction transverse to the taper of the locking member, the other of said members being provided with a plurality of correspondingly cross groove formations in which both of said crossed ribs are adapted selectively to engage whereby said blade may be locked in varied positions in the direction of said taper or transversely thereto, or both; and interfitting selectively engageable serrations between said locking member and the adjacent wall of said supporting body extending in the direction of said taper.

6. A cutter combining a supporting body having a tapered blade opening therein; a cutter blade member mounted therein; an elongated locking member tapered in the direction of its length located in said opening bearing against said blade member, one of said members being provided with a series of grooves extending in a crosswise direction with respect to the direction of said taper; a cooperating rib on the other of said members extending in a corresponding crosswise direction with respect to the direction of said taper and adapted to be selectively engaged in the grooves in the other of said member thereby positively locking said blade and locking member against relative endwise movement; and interfitting tongue and groove formations between said locking member and the adjacent wall of said opening.

7. A cutter combining a supporting body having a tapered blade opening therein; a cutter blade provided with a series of transversely arranged grooves; and a tapered locking member wedging said blade in said opening, said locking member having first interlocking means with said blade and second interlocking means with the cutter body, said first means comprising a rib on said locking member extending longitudinally thereof in the direction of the taper adapted to be selectively engaged in corresponding grooves provided in said blade to vary the position of the latter in one direction, and a rib on said locking member extending transversely to said first rib and adapted to be selectively engaged in corresponding grooves provided in said blade to vary the position of the latter in a transverse direction, and said second interlocking means comprising interfitting serrations between said locking member and the adjacent wall of said openings.

8. A cutter blade and locking means for insertable adjustable blade cutters comprising a blade member; a longitudinally tapered locking member adapted to be arranged adjacent thereto and having interlocking means with said blade member comprising a rib on one of said members extending in the direction of said taper, the other of said members being provided with corresponding grooves in which said rib is selectively engageable; and a rib on one of said members extending transversely to said first rib, the other of said members being provided with corresponding grooves in which said second rib is selectively engageable, said selective engagement for adjustment of the blade with respect to the locking member being adapted to be made prior to insertion in the cutter body opening and to thereafter prevent movement of the blade.

9. A compound cutter blade for insertable blade cutting tools comprising an elongated blade section, and an elongated locking section adapted to be arranged in opposed contiguous relation, said sections being combinedly tapered longitudinally to form a self-wedging insertable cutter blade, one of said sections being provided with a series of grooves in the surface adjacent the other section, said grooves extending in a direction transverse to said taper; a rib on the other of said sections extending transversely to said taper adapted to be selectively engaged in the grooves in the adjacent surface of the other of said sections, and tongue and groove formations on one of said sections on the side away from the opposed section, said tongue and groove formations extending in the direction of said taper.

10. A compound cutter blade for insertable blade cutting tools comprising an elongated blade section and an elongated longitudinally tapered locking section adapted to be arranged in opposed contiguous relation and inserted as a unit in a tapered blade opening, a rib on one of said sections extending in the direction of said taper, the other of said sections being provided with corresponding grooves in the adjacent surface in which said rib is adapted to be selectively engaged; a rib on one of said sections extending in a direction transverse to the direction of said taper, the other of said sections being provided with corresponding grooves in the adjacent surface in which said last named rib is adapted selectively to be engaged, and tongue and groove formations on said locking section extending in the direction of said taper.

OLE SEVERSON.